US008438597B2

(12) United States Patent
Asahara et al.

(10) Patent No.: US 8,438,597 B2
(45) Date of Patent: May 7, 2013

(54) VEHICULAR COMMUNICATION SYSTEM AND VEHICULAR COMMUNICATION PROGRAM

(75) Inventors: Nobuaki Asahara, Wako (JP); Ryoji Igarashi, Wako (JP); Hidehiko Anzai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 12/579,878

(22) Filed: Oct. 15, 2009

(65) Prior Publication Data

US 2010/0146562 A1 Jun. 10, 2010

(30) Foreign Application Priority Data

Dec. 9, 2008 (JP) ................................ 2008-313035

(51) Int. Cl.
*H04N 5/445* (2011.01)

(52) U.S. Cl.
USPC .................... 725/44; 725/39; 725/75; 725/76

(58) Field of Classification Search ........................ None
See application file for complete search history.

(56) References Cited

U.S. PATENT DOCUMENTS

| | | | | |
|---|---|---|---|---|
| 5,532,945 | A * | 7/1996 | Robinson | 713/321 |
| 6,738,712 | B1 * | 5/2004 | Hildebrant | 701/431 |
| 6,810,527 | B1 * | 10/2004 | Conrad et al. | 725/76 |
| 2005/0213548 | A1 * | 9/2005 | Benson et al. | 370/338 |
| 2008/0278345 | A1 * | 11/2008 | Van Bosch et al. | 340/870.07 |

FOREIGN PATENT DOCUMENTS

| | | | |
|---|---|---|---|
| JP | 2001-127656 | A | 5/2001 |
| JP | 2004-260613 | A | 9/2004 |
| JP | 2005-184316 | A | 7/2005 |
| JP | 2006-092451 | A | 4/2006 |
| JP | 2006-319889 | A | 11/2006 |

* cited by examiner

*Primary Examiner* — Chenea Smith
(74) *Attorney, Agent, or Firm* — Arent Fox LLP

(57) ABSTRACT

According to a vehicular communication system (10) of the present invention, a specified time slot in compliance with one broadcast time slot corresponded to one attribute pertinent to or possessed by a vehicle (1) among a plurality of attributes corresponded to a plurality of broadcast time slots of programs, respectively, according to the broadcast program list. Even though the IGN switch (101) of the vehicle (1) is set at the OFF state, the vehicular communication system (10) is operated or kept at the operating state so as to receive the program broadcasted in the specified time slot.

5 Claims, 5 Drawing Sheets

FIG.3 (a)

| BROADCAST TIME SLOT | TARGET AREA | PROGRAM CONTENT |
|---|---|---|
| $T_1$ | A | POI INFORMATION |
| $T_2$ | B | POI INFORMATION |
| $T_3$ | C | POI INFORMATION |
| $T_4$ | A | POI INFORMATION |
| $T_5$ | B | POI INFORMATION |
| $T_6$ | C | POI INFORMATION |

FIG.3 (b)

| BROADCAST TIME SLOT | TARGET VIN | PROGRAM CONTENT |
|---|---|---|
| $T_1$ | 1234○○○○ | UNIT B PROGRAM |
| $T_2$ | 2234○○○○ | UNIT A PROGRAM |
| $T_3$ | 3234○○○○ | UNIT C PROGRAM |
| $T_4$ | 1234○○○○ | UNIT B PROGRAM |
| $T_5$ | 2234○○○○ | UNIT A PROGRAM |
| $T_6$ | 3234○○○○ | UNIT C PROGRAM |

VEHICULAR COMMUNICATION SYSTEM AND VEHICULAR COMMUNICATION PROGRAM

BACKGROUND OF THE INVENTION

1. Field of the Invention

The present invention relates to a vehicular communication system and the like mounted in a vehicle.

2. Description of the Related Art

There has been disclosed an art which makes a vehicular communication system mounted in a vehicle receive a broadcast program list and a broadcast program according to the broadcast program list. In relation to the mentioned art, there has been disclosed another art which sends a program reserved for recording to a server when the reserved program is difficult to be received by a vehicular receiving terminal and records it from the server (refer to Japanese Patent Laid-open No, 2005-184316).

There has been disclosed another art which distributes a program list for terrestrial digital broadcasting (refer to Japanese Patent Laid-open No. 2004-260613).

However, if an IGN switch of a vehicle is at the OFF state, the power supply to devices including the communication system mounted in the vehicle is stopped, and consequently, a broadcast program cannot be received. In this situation, it is necessary for a user to turn the IGN switch into the ON state so as to receive the broadcast program. On the other hand, if the IGN switch of the vehicle is set at the ON state and meanwhile there is no receiving of a broadcast program needed by the vehicle or the user, the power supply to the communication system will be consumed unnecessarily.

SUMMARY OF THE INVENTION

The present invention has been accomplished in view of the aforementioned problems, and it is therefore an object of the present invention to provide a vehicular communication system and the like capable of receiving with perfect efficiency a broadcast program which is mostly needed by a vehicle or a user thereof.

To attain an object described above, the vehicular communication system of the present invention, which is mounted in a vehicle, comprises: a receiving element configured receive a broadcast program list and a broadcast program; a specified time slot setting element configured to set a specified time slot in compliance with one broadcast time slot corresponded to one attribute pertinent to or possessed by the vehicle among a plurality of attributes corresponded to a plurality of broadcast time slots, respectively, according to the broadcast program list received by the receiving element; and a controlling element configured to operate the vehicular communication system or to keep the vehicular communication system at the operating state to make the receiving element receive the broadcast program corresponded to the broadcast program list on condition that a present time is contained in the specified time slot set by the specified time slot setting element when an IGN switch of the vehicle is at the OFF state.

According to the vehicular communication system of the present invention, the specified time slot in compliance with one broadcast time slot corresponded to one attribute pertinent to or possessed by the vehicle among the plurality of attributes corresponded to the plurality of broadcast time slots, respectively, according to the broadcast program list is set.

Even though the IGN switch of the vehicle is set at the OFF state, the vehicular communication system can be operated or kept at the operating state so as to receive a program broadcasted in a specified time slot. Therefore, even though the IGN switch is at the OFF state, if the present time is in the specified time slot, the program can be received by operating the vehicular communication system or keeping it at the operating state.

Moreover, even though the IGN switch is turned from the ON state into the OFF state during the receiving of the program, if the present time is in the specified time slot, the receiving of the program can be continued by keeping the vehicular communication system at the operating state.

Thereby, even though the IGN switch is at the OFF state, the broadcast program which is mostly needed by the vehicle or the user thereof in view of the attribute of the vehicle can be received efficiently by operating the vehicular communication system only in the minimum time duration.

It is acceptable that the specified time slot setting element is configured to set the specified time slot in compliance with one broadcast time slot corresponded to one area where the vehicle is positioned among a plurality of areas served as the plurality of attributes contained in the broadcast program list.

According to the vehicular communication system of the mentioned configuration, the broadcast program which is mostly needed by the vehicle or the user thereof in view of the position of the vehicle can be received efficiently by operating the vehicular communication system only in the minimum time duration even though the IGN switch is at the OFF state.

It is acceptable that the specified time slot setting element is configured to set the specified time slot in compliance with one broadcast time slot corresponded to one vehicular identifier group containing a vehicular identifier of the vehicle among a plurality of vehicular identifier groups for identifying vehicles and the plurality of vehicular identifier groups are served as the plurality of attributes contained in the broadcast program list.

According to the vehicular communication system of the mentioned configuration, the broadcast program which is mostly needed by the vehicle or the user thereof in view of the vehicular identifier of the vehicle can be received efficiently by operating the vehicular communication system only in the minimum time duration even though the IGN switch is at the OFF state.

It is acceptable that the receiving element is configured to receive a POI information or a software programmed to apply a function to a device mounted in the vehicle as the broadcast program.

According to the vehicular communication system of the mentioned configuration, the POI information or the software which is mostly needed by the vehicle or the user thereof in view of the attribute of the vehicle can be received efficiently by operating the vehicular communication system only in the minimum time duration even though the IGN switch is at the OFF state.

It is acceptable that the controlling element is configured to turn the operating vehicular communication system into sleep on condition that the broadcast program has been received by the receiving element or the specified time slot has elapsed.

According to the vehicular communication system of the mentioned configuration, the broadcast program which is mostly needed by the vehicle or the user thereof in view of the attribute of the vehicle can be received efficiently by operating the vehicular communication system only in the minimum time duration even though the IGN switch is at the OFF state from the viewpoint of receiving or capable of receiving the broadcast program.

To attain an object described above, a vehicular communication program of the present invention is configured to make a vehicular computer provided with a wireless communication device function as the vehicular communication system.

According to the vehicular communication program of the present invention, the broadcast program which is mostly needed by the vehicle or the user thereof in view of the attribute of the vehicle can be received efficiently by making the vehicular computer function as the vehicular communication system only in the minimum time duration even though the IGN switch is at the OFF state.

BRIEF DESCRIPTION OF THE DRAWINGS

FIG. 3(*a*) and FIG. 3(*b*) are explanatory diagrams illustrating broadcast program lists, respectively.

DETAILED DESCRIPTION OF THE PREFERRED EMBODIMENTS

Hereinafter, an embodiment of a vehicular communication system and the like according to the present invention will be described with reference to the drawings.

Figure 1:
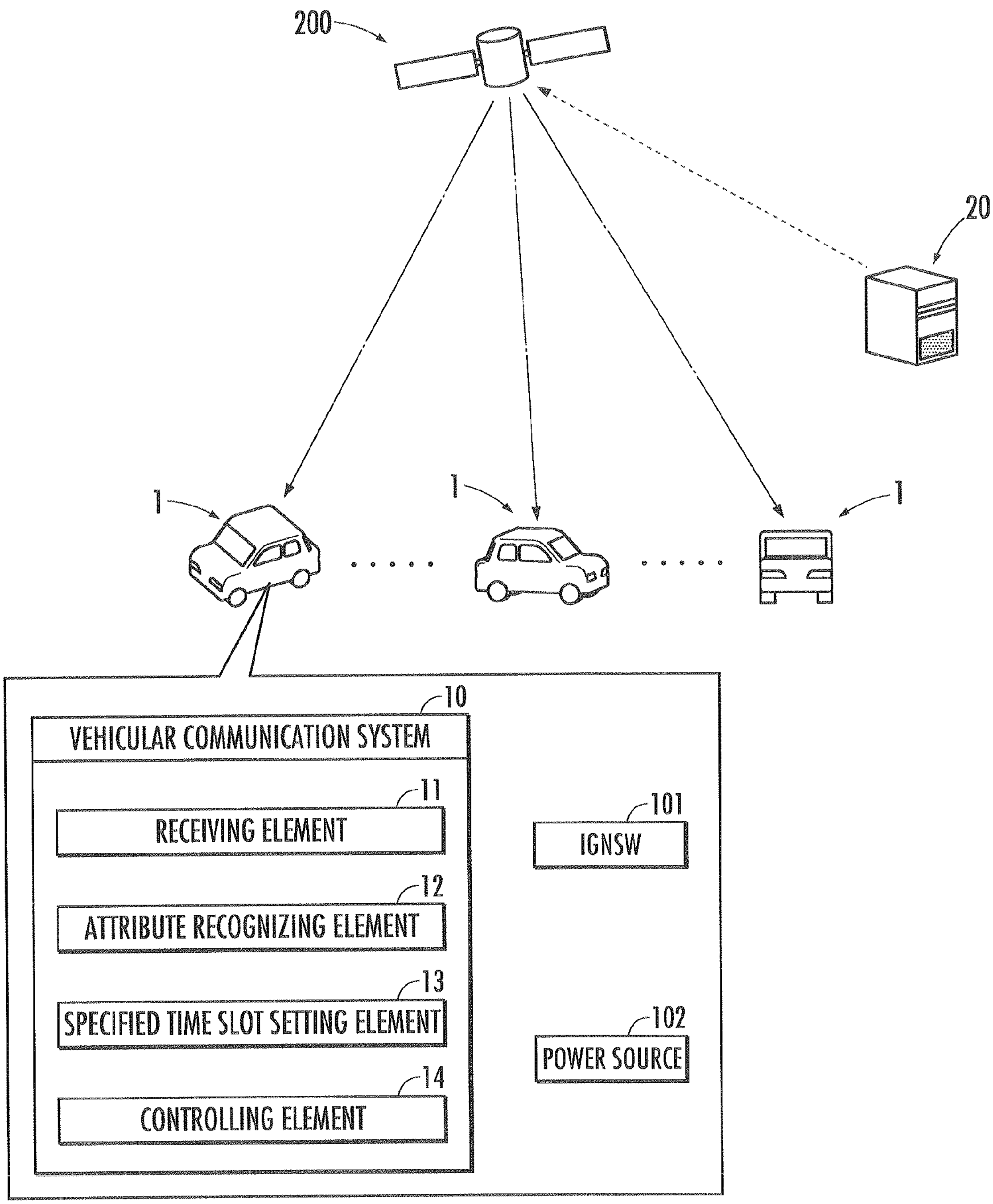
FIG. 1 is a schematic diagram illustrating a vehicle and a vehicular communication system of the present invention.

As illustrated in FIG. 1, a vehicle (a four-wheeled automobile) 1 is provided with an IGN (ignition) switch 101, a power source 102, and a vehicular communication system 10.

The switching between ON and OFF of the IGN switch 101 is configured to lead a state-switching of the vehicular communication system 10, which will be described hereinafter. It is also acceptable to configure the switching between ON and OFF of an ACC (accessory) switch as a substitute for the IGN switch 101 to result in the state-switching of the vehicular communication system 10.

The power source 102 provides a power supply to the vehicular devices such as the vehicular communication system 10 through a converter or a voltage-adjusting unit where appropriate. A battery, a capacitor or a secondary battery, or a combination thereof can be mounted in the vehicle 1 as the power source 102.

The vehicular communication system 10 is composed of a computer or an ECU (Electronic Control Unit composed of CPU, ROM, RAM, I/O and the like). A memory or a storing device included in the ECU stores a vehicular communication program as software. The vehicular communication program is retrieved and executed by the CPU appropriately so as to make the ECU function as the vehicular communication system 10. The vehicular communication program may be preliminarily stored in the memory, or may be installed in the computer through the intermediary of a recording medium such as a CD-ROM, or may be distributed or broadcasted from a server and stored in the memory after it is received by a wireless communication device from the server.

The vehicular communication system 10 is provided with a receiving element 11, an attribute recognizing element 12, a specified time slot setting element 13, and a controlling element 14.

The receiving element 11 is configured to receive a broadcast program list and a broadcast program broadcasted or multicast from a server 20 through the intermediary of a satellite 200. The receiving element 11 is provided with a wireless communication device. The wireless communication device and the ECU constituting the vehicular communication system 10 may be mounted separately in the vehicle 1. It is acceptable to mount a communication device such as a cell phone or the like in the vehicle 1 as the receiving element 11. The mentioned communication device may be inserted in a cradle disposed in the compartment of the vehicle 1.

The attribute recognizing element 12 is configured to recognize an attribute of the vehicle 1 on the basis of output signals from a sensor or the like.

The specified time slot setting element 13 is configured to set a specified time slot in compliance with one broadcast time slot corresponded to one attribute pertinent to or possessed by the vehicle 1 on the basis of the attribute of the vehicle 1 recognized by the attribute recognizing element 12 among a plurality of attributes corresponded to a plurality of broadcast time slots, respectively, according to the broadcast program list received by the receiving element 11.

The controlling element 14 is configured to operate the vehicular communication system 10 or to keep it at the operating state to make the receiving element 11 receive the broadcast program corresponded to the broadcast program list on condition that a present time is contained in the specified time slot set by the specified time slot setting element 13 when an IGN switch 101 of the vehicle is at the OFF state. Moreover, the controlling element 14 is configured to turn the operating vehicular communication system 10 into sleep on condition that the broadcast program has been received by the receiving element 11 or the specified time slot has elapsed.

Hereinafter, descriptions will be carried on the functions of the vehicular communication system 10 with the configuration mentioned above. When the IGN switch 101 of the vehicle 1 is at the ON state and the vehicular communication system 10 is at the operating state, the broadcast program list broadcasted from the server 20 through the intermediary of the satellite 200 is received by the receiving element 11 (FIG. 2(*a*)/STEP 002).

The broadcast program list is stored in the memory or the storing device. The program list contains a plurality of broadcast time slots, a plurality of attributes and program contents related to the plurality of broadcast time slots. Specifically, the broadcast program list as illustrated in FIG. 3(*a*) includes "broadcast time slot", "target area" served as the attribute, and "program content" and can be broadcasted. Moreover, the broadcast program list as illustrated in FIG. 3(*b*) includes "broadcast time slot", "target VIN" (Vehicular Identification Number) served as the attribute, and "program content" and can be broadcasted. If there is a time difference existed in the broadcast target areas, it is acceptable to use GMT (world standard time) to define the broadcast time slot.

Figure 2:
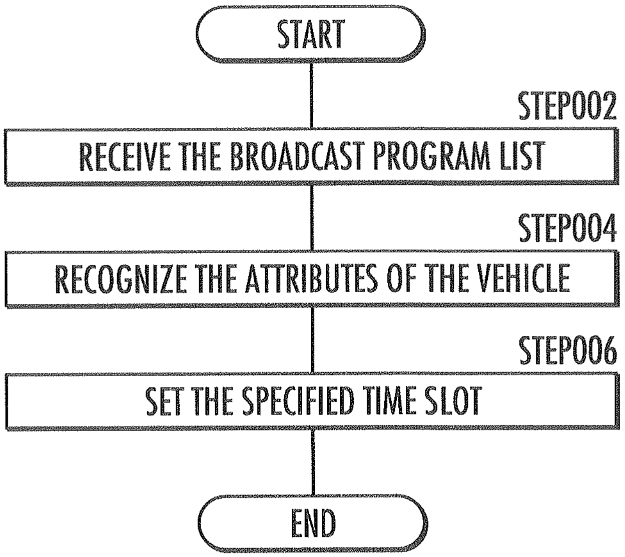
FIG. 2 is a flow chart illustrating functions of the vehicular communication system.
Figure 2:
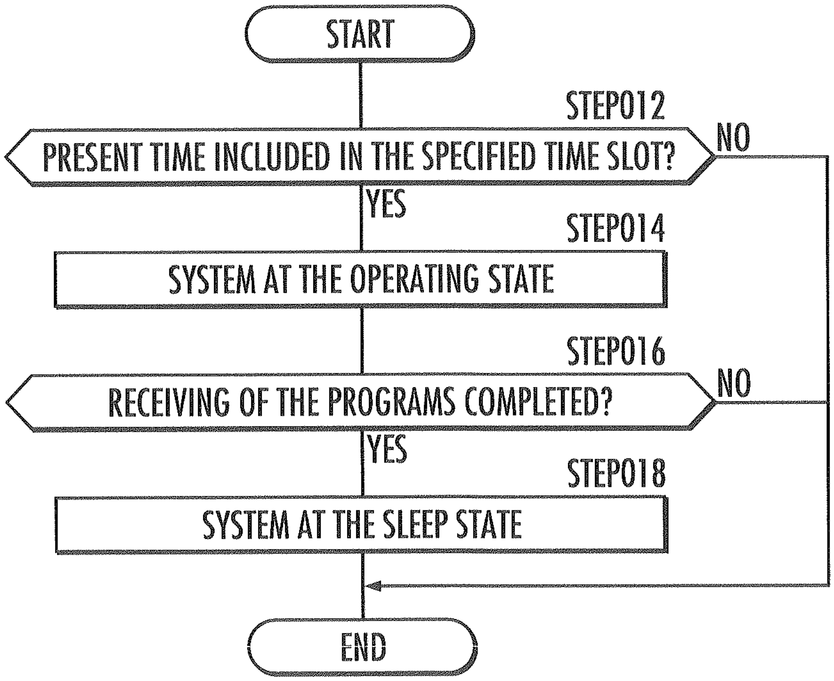

Thereafter, the attribute of the vehicle 1 is recognized by the attribute recognizing element 12 (FIG. 2(*a*)/STEP 004).

Specifically, a position of the vehicle 1 which is determined on the basis of GPS signals received by a GPS receiver and if necessary output signals from a sensor, such as an acceleration sensor or the like, mounted in the vehicle 1 and stored in a storing device is retrieved from the storing device as the attribute. It is acceptable that an area containing the position thereof is recognized as the attribute. It is also acceptable that the entire part or an essential part of VIN inherent in the vehicle 1 is retrieved from the storing device as the attribute.

As the position of the vehicle 1 varies with time, it is acceptable to use a determination position determined immediately after the receiving of the broadcast program list, right at a switching time where the IGN switch 101 is switched from the ON state to the OFF state, or immediately before or after the switching time as the attribute. Herein, the determination position corresponds to a parking position of the vehicle 1 or a position adjacent to the parking position.

On the other hand, for the attribute such as a VIN which will not change with time, it may be retrieved from the storing device at any time after the receiving of the program list.

Subsequently, a specified time slot is set by the specified time slot setting element 13 in compliance with one broadcast time slot corresponded to one attribute pertinent to or possessed by the vehicle 1 on the basis of the attribute recognized by the attribute recognizing element 12 among a plurality of attributes included in the program list (FIG. 2(*a*)/STEP 006).

For example, in a plurality of vehicles 1 which have received the program list as illustrated in FIG. 3(*a*) , one or a plurality of time slots are set as the specified time slot in such a way that the specified time slot is in compliance with or is included in one or both of the broadcast time slots T1 and T4 for the vehicle 1 positioned in the area A; one or a plurality of time slots are set as the specified time slot in such a way that the specified time slot is in compliance with or is included in one or both of the broadcast time slots T2 and 15 for the vehicle 1 positioned in the area B; and one or a plurality of time slots are set as the specified time slot in such a way that the specified time slot is in compliance with or is included in one or both of the broadcast time slots 13 and T6 for the vehicle 1 positioned in the area C.

Further, in a plurality of vehicles 1 which have received the program list as illustrated in FIG. 3(*b*), one or a plurality of time slots are set as the specified time slot in such a way that the specified time slot is in compliance with or is included in one or both of the broadcast time slots T1 and T4 for the vehicle 1 with the VIN of "1234OOOO" (the figures of the VIN are numbers or symbols predefined); one or a plurality of time slots are set as the specified time slot in such a way that the specified time slot is in compliance with or is included in one or both of the broadcast time slots T2 and T5 for the vehicle 1 with the VIN of "2234OOOO" (the figures of the VIN are numbers or symbols predefined); one or a plurality of time slots are set as the specified time slot in such a way that the specified time slot is in compliance with or is included in one or both of the broadcast time slots T3 and T6 for the vehicle 1 with the VIN of "3234OOOO" (the figures of the VIN are numbers or symbols predefined).

After the IGN switch 101 is switched from the ON state to the OFF state, whether or not a present time timed by a clock is contained in the specified time slot is determined by the controlling element 14 (FIG. 2(*b*)/STEP 012).

At this moment, the vehicular communication system 10 is at the standby state, the minimum power needed by the determination processing is supplied from the power source 102 to the vehicular communication system 10. It should be noted that the determination processing may be performed not only after the IGN switch 101 is switched from the ON state to the OFF state but also when the IGN switch 101 in at the ON state.

If the present time is determined to be contained in the specified time slot (FIG. 2(*b*)/STEP 012 . . . YES), the vehicular communication system 10 is maintained at or switched to the operating state by the controlling element 14 (FIG. 2(*b*)/STEP 014).

If the present time is determined to be contained in the specified time slot while the vehicular communication system 10 is at the standby state, a greater power supply compared to that of the standby state is provided from the power source 102 to the vehicular communication system 10 to actuate it to the operating state. Accordingly, the programs being broadcasted according to the program list can be received by the receiving element 11 from the server 20 through the intermediary of the satellite 200 and stored in the storing device. If the present time is determined not to be contained in the specified time slot (FIG. 2(*b*)/STEP 012 . . . NO), whether or not the present time is contained in the specified time slot is determined repeatedly (FIG. 2(*b*)/STEP 012).

If the present time is determined to be beyond the specified time slot (FIG. 2(*b*)/STEP 012 . . . NO), the vehicular communication system 10 is transferred from the standby state to the sleep state (FIG. 2(*b*)/STEP 018).

Figure 4:
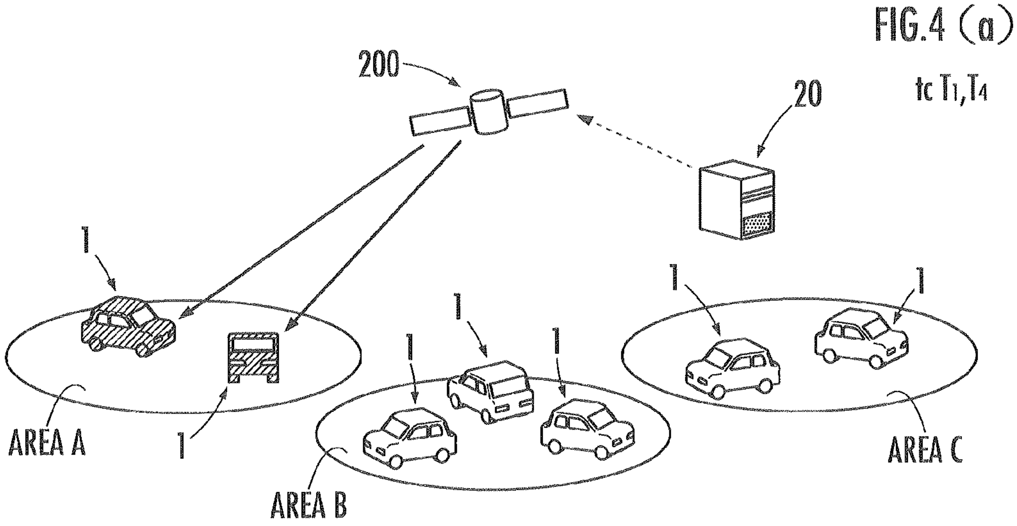
FIGS. 4(*a*) to 4(*c*) are schematic diagrams illustrating receiving manners of the broadcast programs.
Figure 4:
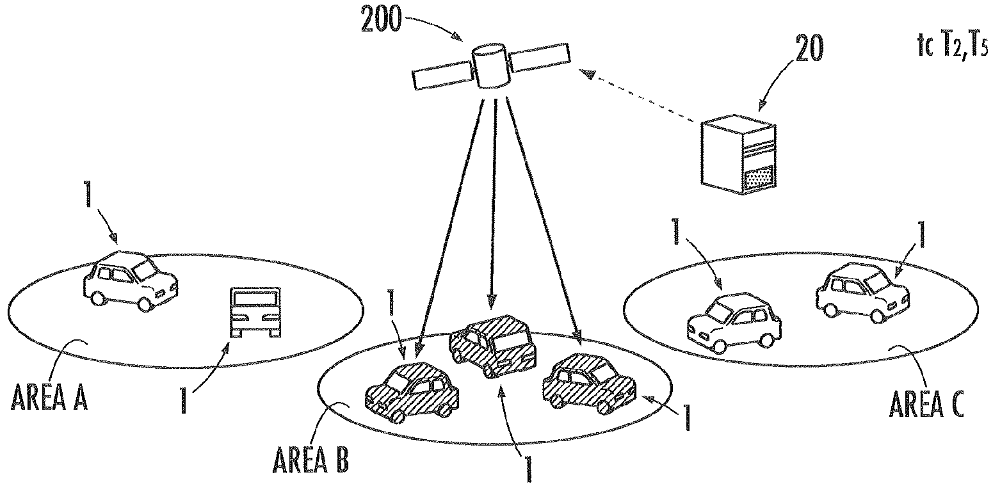
Figure 4:
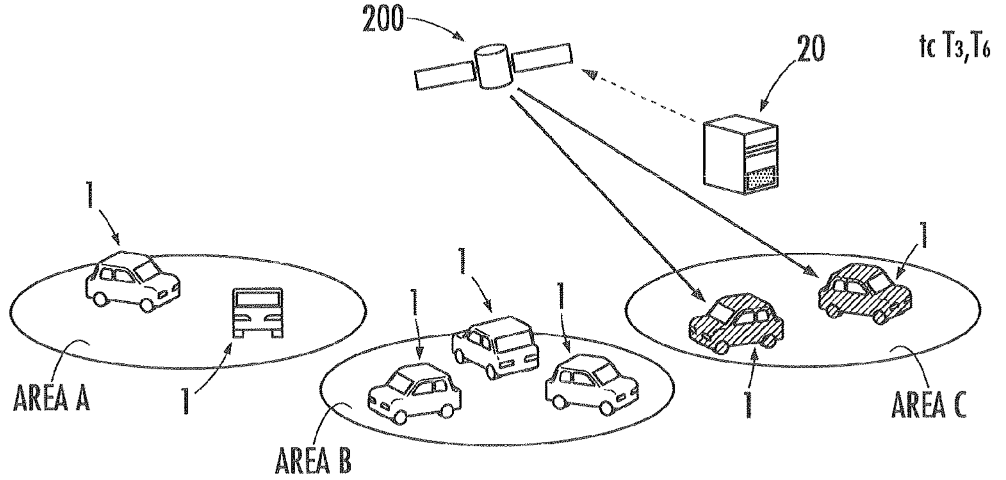

For example, in a plurality of vehicles 1 received with the program list as illustrated in FIG. 3(*a*), the POI information can be received as the program at a time within the broadcast time slot T1 or T4 by the vehicle 1 whose recognized position or the present position is inside the area A, as illustrated in FIG. 4(*a*).

As illustrated in FIG. 4(*b*), the POI information can be received as the program at a time within the broadcast time slot T2 or T5 by the vehicle 1 whose recognized position or the present position is inside the area B.

As illustrated in FIG. 4(*c*), the POI information can be received as the program at a time within the broadcast time slot T3 or T6 by the vehicle 1 whose recognized position or the present position is inside the area C.

In addition to a commercial facility such as a restaurant, a dealer or the like inherent in each area or the position of headquarter thereof and related information thereof, a place where an event is being held or is happening in each area and related information thereof may be used as the POI information. The POI information may be shown on a display mounted in the vehicle 1 at an appropriate time when the IGN switch 101 of the vehicle 1 is at the ON state.

Figure 5:
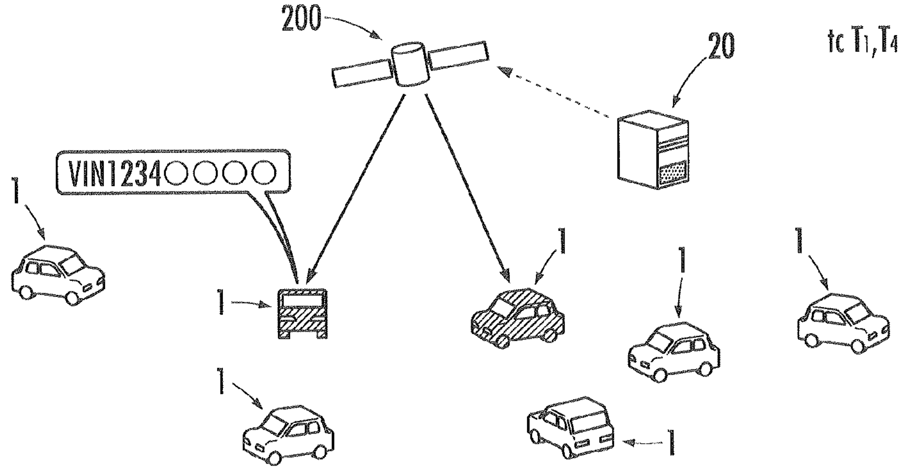
FIGS. 5(*a*) to 5(*c*) are schematic diagrams illustrating receiving manners of the broadcast programs.
Figure 5:
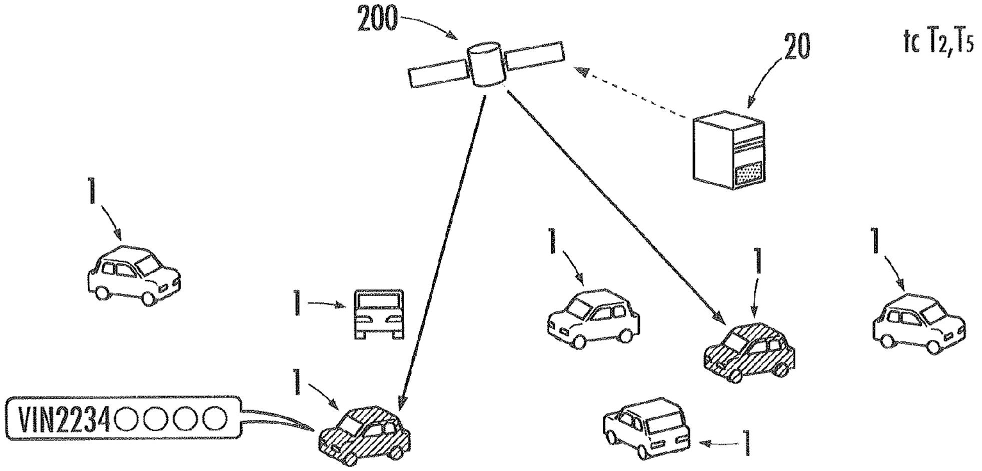
Figure 5:
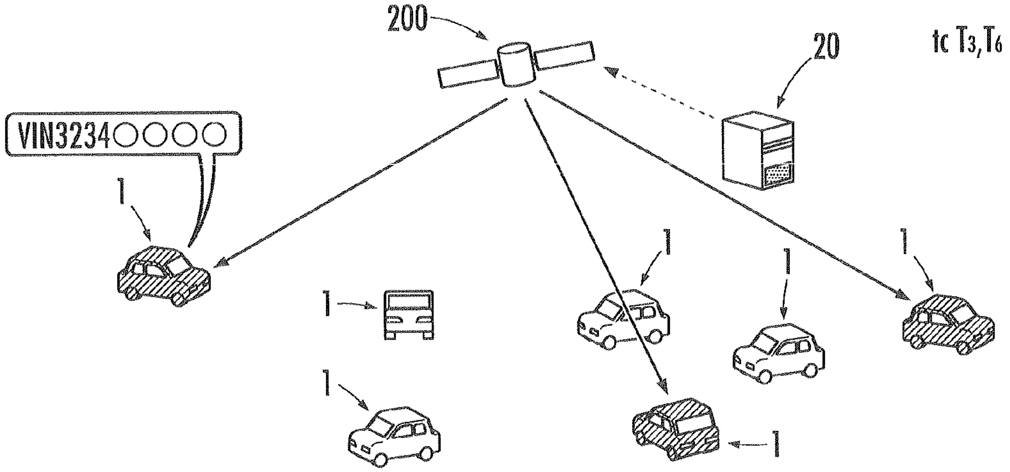

In a plurality of vehicles 1 received with the program list as illustrated in FIG. 3(*a*), a software programmed to add or upgrade the function of a unit B is received as the program at a time within the broadcast time slot T1 or T4 by the vehicle 1 whose VIN is "123OOOO", as illustrated in FIG. 5(*a*).

As illustrated in FIG. 5(*b*), the software programmed to add or upgrade the function of the unit A is received as the program at a time within the broadcast time slot T2 or T5 by the vehicle 1 whose VIN is "223OOOO".

As illustrated in FIG. 5(*c*), the software programmed to add or upgrade the function of the unit C is received as the program at a time within the broadcast time slot T3 or T6 by the vehicle 1 whose VIN is "323OOOO".

After permitted by the user where appropriate, the unit among units mounted in the vehicle 1 exhibits added or upgraded functions programmed by the software when the IGN switch 101 is switched off next time.

Then, whether or not the receiving of the program has been completed is determined by the controlling element 14 (FIG. 2(*b*)/STEP 016)

When it is determined that the receiving of the program has not been completed (FIG. 2(*b*)/STEP 016 . . . NO), whether or not the present time is contained in the specified time slot is determined again (FIG. 2(*b*)/STEP 012).

In the receiving of the program, even though the IGN switch 101 is switched from the ON state to the OFF state, the vehicular communication system 10 will be maintained at the operating state to continue the receiving of the program.

When it is determined that the receiving of the program has been completed (FIG. 2(*b*)/ STEP 016 . . . YES), under controlling by the controlling element 14, the vehicular communication system 10 stores the program in the storing device, and turns to the sleep state where the determination processing, which determines whether the present time is contained in the specified time slot or the like, is suspended due to the power supplied thereto from the power source 102 reduced by the controlling element 14 (FIG. 2(*b*)/STEP 018).

According to the vehicular communication system 10 exhibiting the aforementioned functions, the specified time slot in compliance with one broadcast time slot corresponded to one attribute pertinent to or possessed by the vehicle 1 among the plurality of attributes corresponded to the plurality of broadcast time slots, respectively, according to the broadcast program list is set (refer to FIG. 2(*a*) , FIG. 3(*a*) and FIG. 3(*b*)).

Even though the IGN switch 101 of the vehicle 1 is at the OFF state, the vehicular communication system 10 can be operated or kept at the operating state so as to receive a program broadcasted in a specified time slot (refer to FIG. 2(*b*)).

Therefore, even though the IGN switch 101 is at the OFF state, if the present time is in the specified time slot, the program can be received by operating the vehicular communication system 10 or keeping it at the operating state (refer to FIG. 4 and FIG. 5).

Moreover, even though the IGN switch 101 is turned from the ON state into the OFF state during the receiving of the program, if the present time is in the specified time slot, the receiving of the program can be continued by keeping the vehicular communication system 10 at the operating state, and the vehicular communication system 10 is turned to the sleep state after the receiving of the program is completed (refer to FIG. 2(*b*)).

According thereto, even though the IGN switch 101 is at the OFF state, the broadcast program which is mostly needed by the vehicle 1 or the user thereof in view of the attributes of the vehicle, such as the position of the vehicle 1, the VIN and the like, can be received efficiently by operating the vehicular communication system 10 in the minimum time duration only.

What is claimed is:

1. A vehicular communication system mounted in a vehicle, comprising:

at least one processor configured to:

receive a broadcast program list, when an ignition (IGN) switch of the vehicle is at an ON state and the vehicular communication system is at an operating state;

retrieve a position of the vehicle at a time when the IGN switch of the vehicle is switched from the ON state to an OFF state;

set a specified time slot in compliance with one of a plurality of broadcast time slots corresponding to one of a plurality of where covering the retrieved position of the vehicle in connection with the received broadcast program list, when the IGN switch of the vehicle is switched from the ON state to the OFF state, the plurality of areas serving as a plurality of attributes and corresponding to the plurality of broadcast time slots, respectively;

switch the vehicular communication system to the operating state on a condition that a present time is contained in the specified time slot when the IGN switch of the vehicle is at the OFF state and the vehicular communication system is at a standby state; and receive a broadcast program, when the IGN switch of the vehicle is at the OFF state and the vehicular communication system is at a starting state;

wherein a minimum power is supplied to the vehicular communication system in the standby state, and a greater power is supplied to the vehicular communication system in the operating state than in the standby state.

2. The vehicular communication system according to claim 1, wherein the at least one processor is further configured to set the specified time slot in compliance with one broadcast time slot corresponding to one vehicular identifier group containing a vehicular identifier of the vehicle among a plurality of vehicular identifier groups for identifying vehicles, and the plurality of vehicular identifier groups are served as the plurality of attributes contained in the broadcast program list.

3. The vehicular communication system according to claim 1, wherein the at least one processor is further configured to receive as the broadcast program a Point of Interest (POI) information or a software programmed to apply a function to a device mounted in the vehicle.

4. The vehicular communication system according to claim 1, wherein the at least one processor is further configured put the operating vehicular communication system into a sleep mode on a condition that the broadcast program has been received or the specified time slot has elapsed.

5. A non-transitory computer-readable storage medium that stores a vehicular communication program configured to make a vehicular computer provided with a wireless communication device function as the vehicular communication system of claim 1.

* * * * *